United States Patent
Ballew

(10) Patent No.: US 10,338,696 B1
(45) Date of Patent: Jul. 2, 2019

(54) VIRTUAL REALITY SYSTEM HAVING INTERACTIVE SENSORY SUIT AND GYROSCOPIC SUPPORT

(71) Applicant: David Ballew, Woodruff, SC (US)

(72) Inventor: David Ballew, Woodruff, SC (US)

(*) Notice: Subject to any disclaimer, the term of this patent is extended or adjusted under 35 U.S.C. 154(b) by 254 days.

(21) Appl. No.: 15/444,496

(22) Filed: Feb. 28, 2017

(51) Int. Cl.
| | |
|---|---|
| *G09G 5/00* | (2006.01) |
| *G06F 3/0346* | (2013.01) |
| *G06F 3/01* | (2006.01) |
| *A63B 21/22* | (2006.01) |
| *A41D 13/00* | (2006.01) |
| *A41D 31/00* | (2019.01) |
| *G06T 19/00* | (2011.01) |
| *A63B 71/06* | (2006.01) |

(52) U.S. Cl.
CPC ....... *G06F 3/0346* (2013.01); *A41D 13/0007* (2013.01); *A41D 31/00* (2013.01); *A63B 21/222* (2015.10); *G06F 3/016* (2013.01); *A41D 2500/10* (2013.01); *A41D 2500/20* (2013.01); *A41D 2600/10* (2013.01); *A63B 2071/0655* (2013.01); *G06T 19/006* (2013.01)

(58) Field of Classification Search
CPC ....... G06F 3/016; G06F 3/0346; A41D 31/00; A41D 31/0007; A41D 2600/10; A41D 2500/10; A41D 2500/20; A63B 21/222; A63B 2071/0655; G06T 19/006
See application file for complete search history.

(56) References Cited

U.S. PATENT DOCUMENTS

| | | | |
|---|---|---|---|
| 5,980,256 A | 11/1999 | carmein | |
| 6,331,152 B1* | 12/2001 | Holle | A47C 3/02 434/55 |
| D457,922 S | 5/2002 | Christianson | |
| 7,046,151 B2 | 5/2006 | Dundon | |
| D687,152 S | 7/2013 | Tilk | |
| 8,579,714 B2 | 11/2013 | Wen-Der | |
| 9,372,534 B2 | 6/2016 | da Conceicao | |
| 2011/0067157 A1 | 3/2011 | Xiao | |
| 2016/0139666 A1* | 5/2016 | Rubin | B25J 11/003 345/633 |
| 2016/0166930 A1 | 6/2016 | Brav | |
| 2016/0195923 A1* | 7/2016 | Nauseef | G06F 3/012 348/121 |

* cited by examiner

*Primary Examiner* — Nelson M Rosario
*Assistant Examiner* — Andrew Lee
(74) *Attorney, Agent, or Firm* — Kyle A. Fletcher, Esq.

(57) ABSTRACT

The virtual reality system having interactive sensory suit and gyroscopic support is a peripheral device that interfaces with a computer generated reality system to create physical representations of the created computer generated reality. The virtual reality system having interactive sensory suit and gyroscopic support supplements the visual and audio stimuli generated provided by the computer generated reality system with tactile stimuli appropriate to the computer generated reality that is being rendered including: 1) controlling the position of the body; and 2) applying pressure against the body. The virtual reality system having interactive sensory suit and gyroscopic support comprises a gyroscope and a body suit. The participant wears the body suit while being placed within the gyroscope. The gyroscope controls the position of the participant relative to the force of gravity. The body suit: 1) applies pressure against the participant; and, 2) secures the participant within the gyroscope.

18 Claims, 7 Drawing Sheets

US 10,338,696 B1

VIRTUAL REALITY SYSTEM HAVING INTERACTIVE SENSORY SUIT AND GYROSCOPIC SUPPORT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of human necessities including health and amusement, more specifically, an apparatus for physical training.

SUMMARY OF INVENTION

The virtual reality system having interactive sensory suit and gyroscopic support is configured for use with a system that generates a computer generated reality. The virtual reality system having interactive sensory suit and gyroscopic support is configured for use with a participant. The participant refers to a person who is experiencing the computer generated reality. The virtual reality system having interactive sensory suit and gyroscopic support is a peripheral device that interfaces with the computer generated reality system to created physical representations of the created computer generated reality. The virtual reality system having interactive sensory suit and gyroscopic support responds to control signals that are generated by the computer generated reality system. The virtual reality system having interactive sensory suit and gyroscopic support supplements the visual and audio stimuli generated provided by the computer generated reality system with tactile stimuli appropriate to the computer generated reality that is being rendered. Specifically, the virtual reality system having interactive sensory suit and gyroscopic support: 1) controls the position of the body of the participant relative to the force of gravity; and, 2) applies pressure to selected portions of the body. The virtual reality system having interactive sensory suit and gyroscopic support comprises a gyroscope and a body suit. The participant wears the body suit while being placed within the gyroscope. The gyroscope controls the position of the participant relative to the force of gravity. The body suit: 1) applies pressure against the participant; and, 2) secures the participant within the gyroscope.

These together with additional objects, features and advantages of the virtual reality system having interactive sensory suit and gyroscopic support will be readily apparent to those of ordinary skill in the art upon reading the following detailed description of the presently preferred, but nonetheless illustrative, embodiments when taken in conjunction with the accompanying drawings.

In this respect, before explaining the current embodiments of the virtual reality system having interactive sensory suit and gyroscopic support in detail, it is to be understood that the virtual reality system having interactive sensory suit and gyroscopic support is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the virtual reality system having interactive sensory suit and gyroscopic support.

It is therefore important that the claims be regarded as including such equivalent construction insofar as they do not depart from the spirit and scope of the virtual reality system having interactive sensory suit and gyroscopic support. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
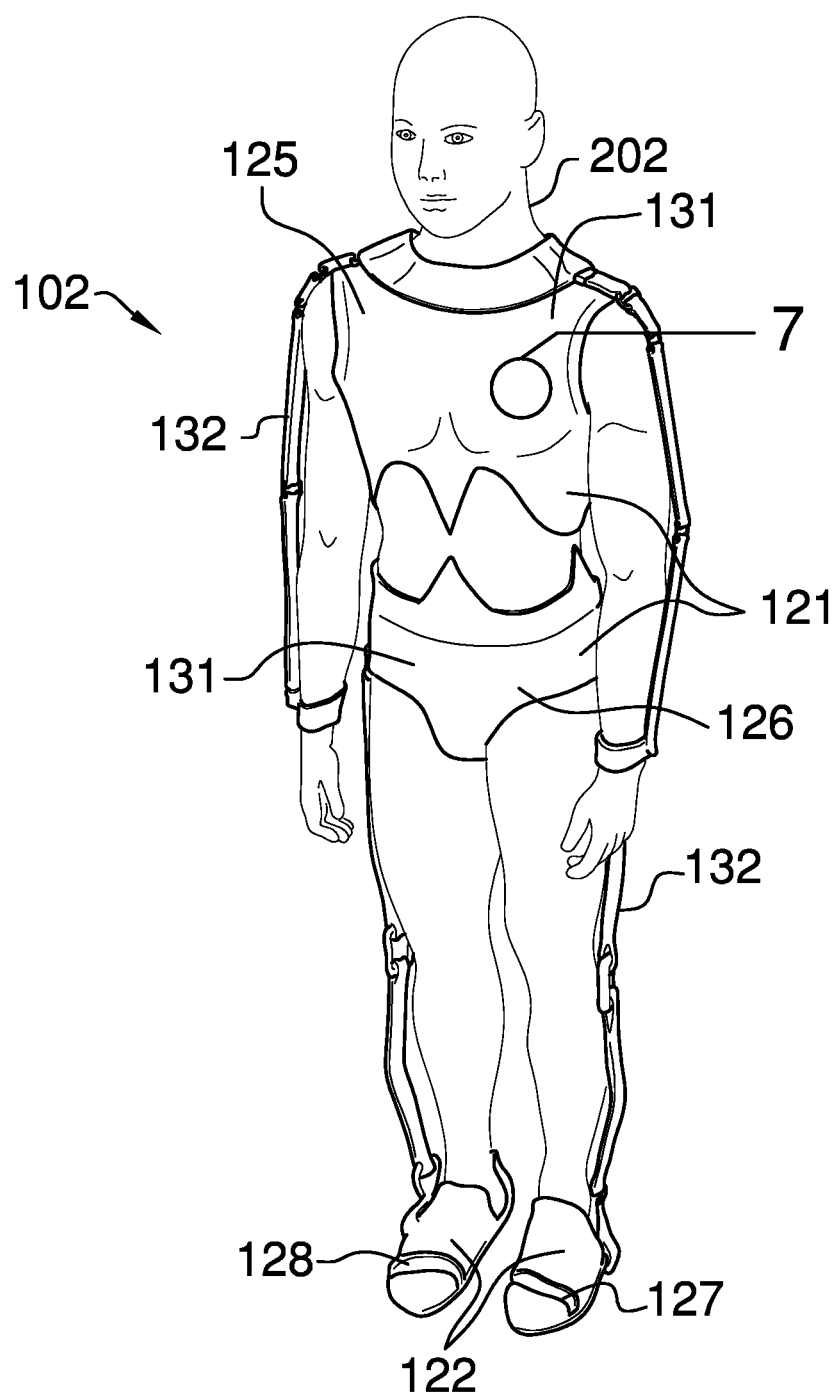
FIG. 1 is a perspective view of a detail of the disclosure.
Figure 2:
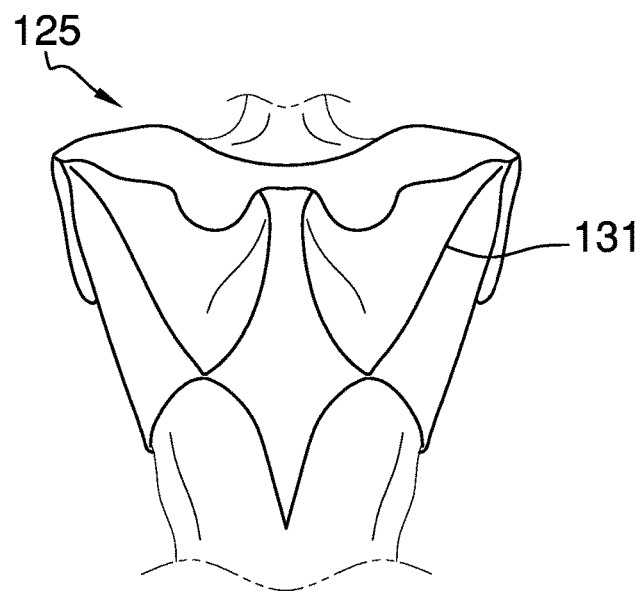
FIG. 2 is a back view of an embodiment of the disclosure.
Figure 3:
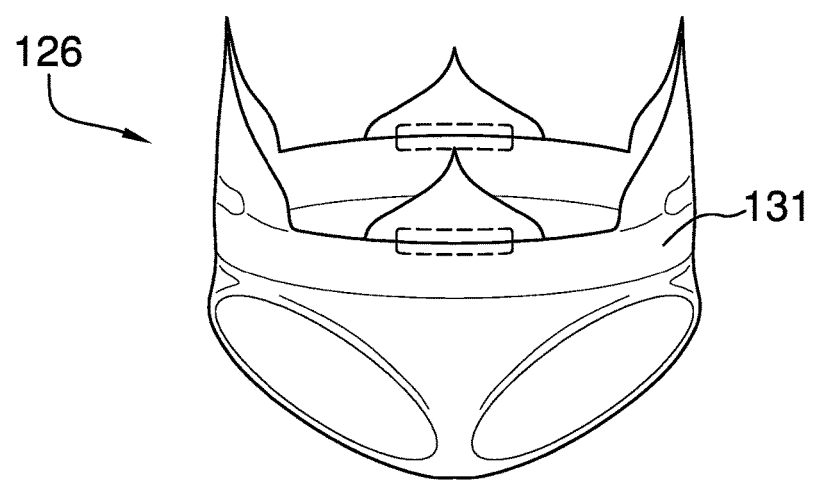
FIG. 3 is a detail view of an embodiment of the disclosure.
Figure 4:
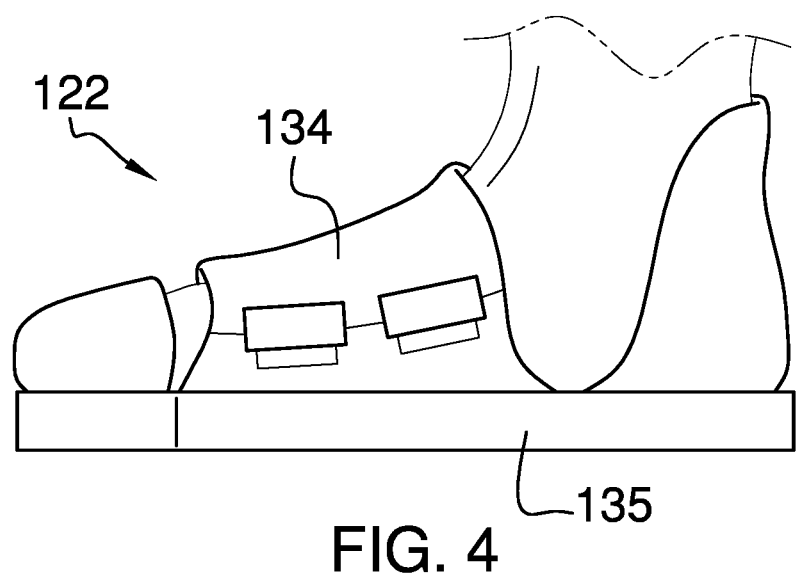
FIG. 4 is a detail view of an embodiment of the disclosure.
Figure 5:
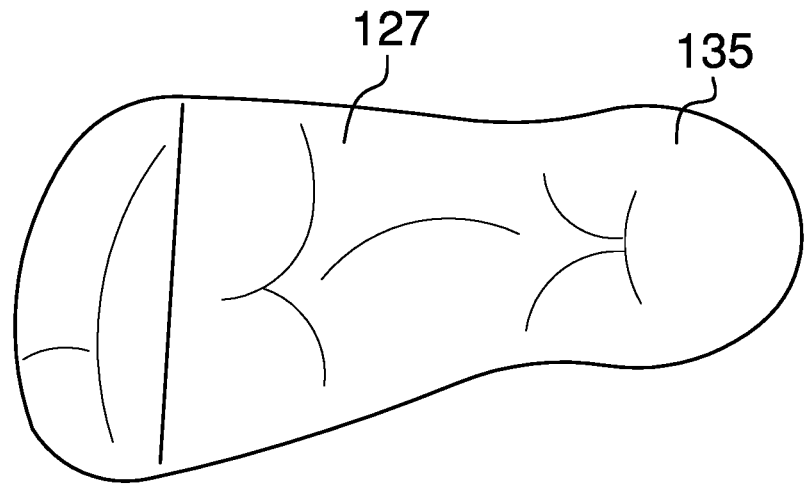
FIG. 5 is a detail view of an embodiment of the disclosure.
Figure 6:
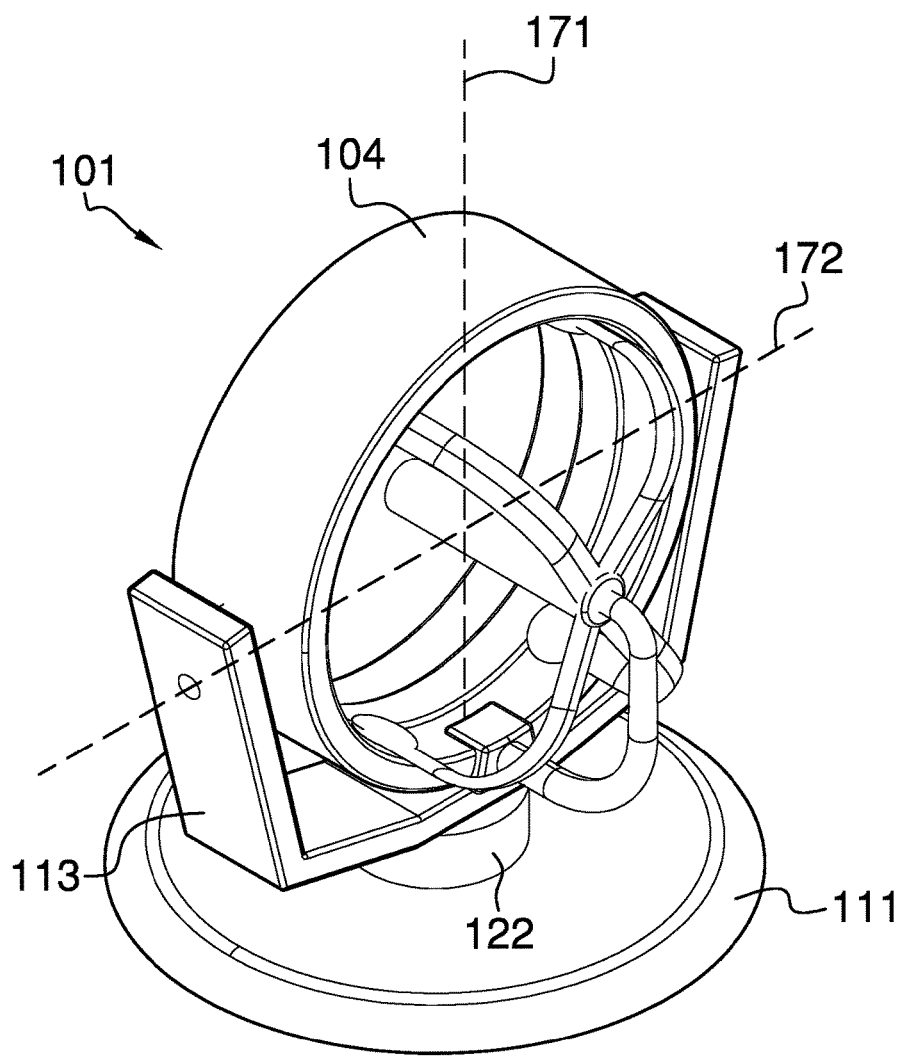
FIG. 6 is a perspective view of a detail of the disclosure.
Figure 7:
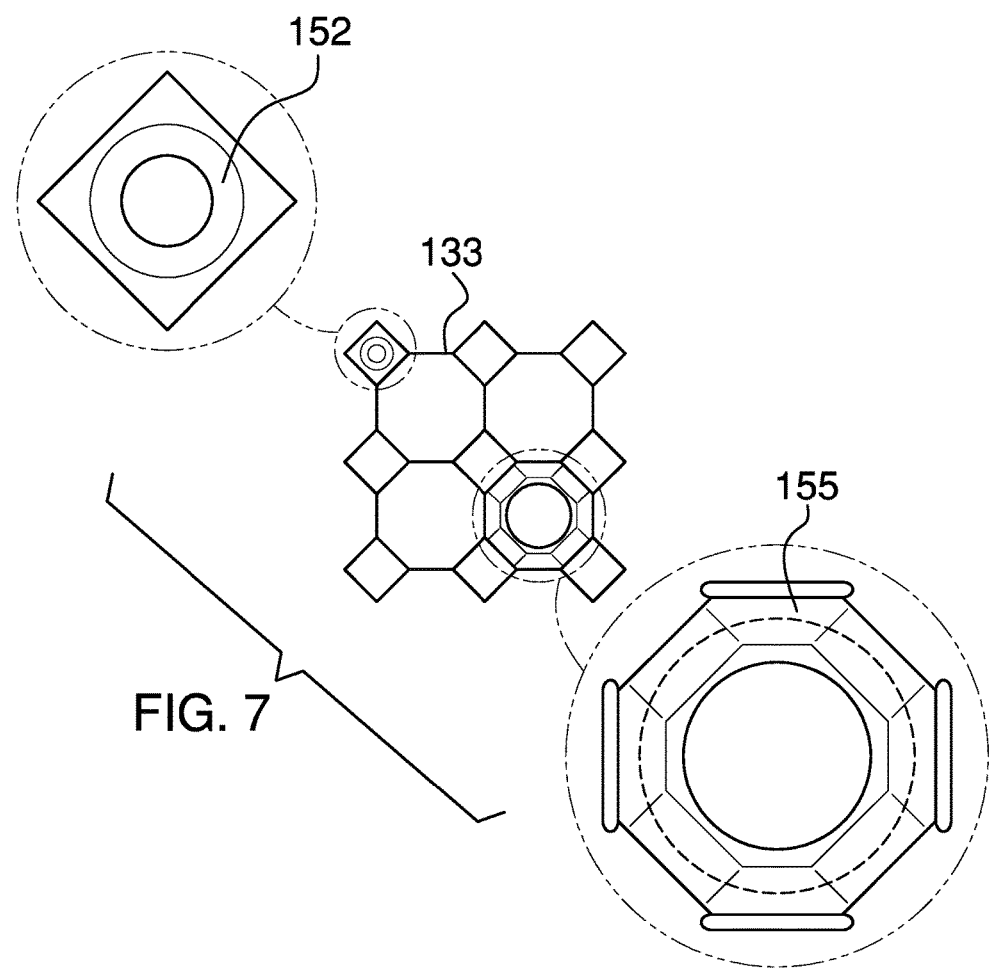
FIG. 7 is a detail view of an embodiment of the disclosure.
Figure 8:
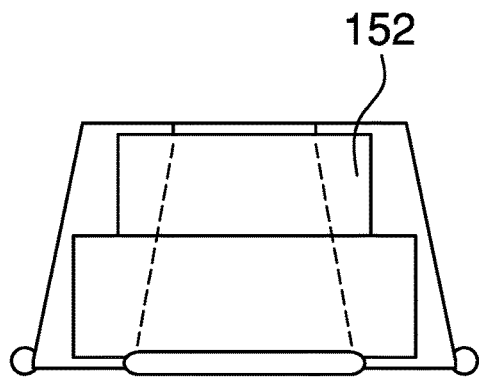
FIG. 8 is a detail view of an embodiment of the disclosure.
Figure 9:
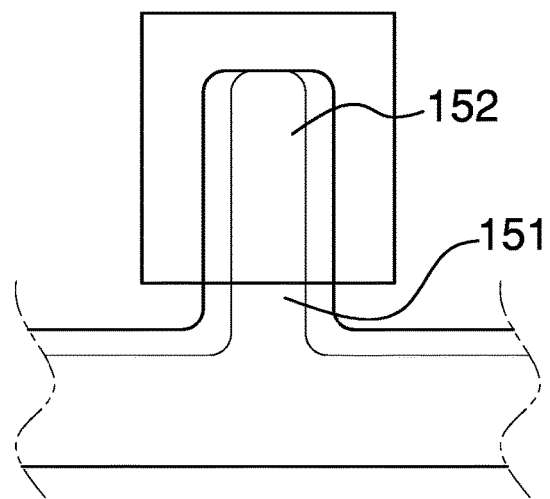
FIG. 9 is an exploded view of an embodiment of the disclosure.
Figure 10:
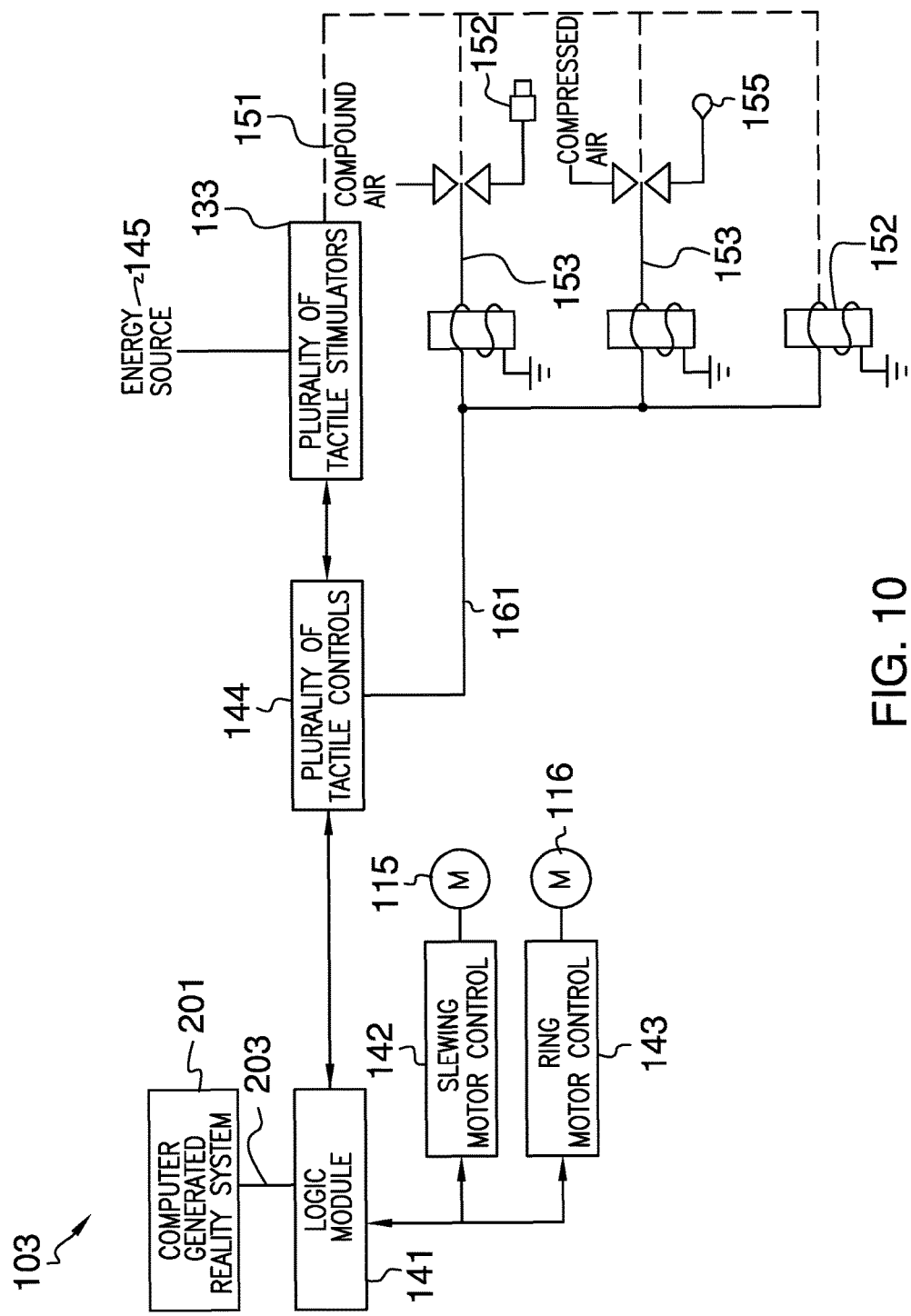
FIG. 10 is a block diagram of an embodiment of the disclosure.

Detailed reference will now be made to one or more potential embodiments of the disclosure, which are illustrated in FIGS. 1 through 10.

The virtual reality system having interactive sensory suit and gyroscopic support 100 (hereinafter invention) is configured for use with a system that generates one or more computer generated realities 201. The invention 100 is configured for use with a participant 202. The invention 100 is a peripheral device that interfaces with the computer generated reality system 201 to create a physical representation of the created computer generated reality. The invention 100 responds to control signals 203 that are generated by the computer generated reality system 201. The invention 100 supplements the visual and audio stimuli generated provided by the computer generated reality system 201 with tactile stimuli appropriate to the computer generated reality that is being rendered. Specifically, the invention 100: 1) controls the position of the body of the participant 202 relative to the force of gravity; and, 2) applies pressure to selected portions of the body of the participant 202.

The invention 100 comprises a gyroscope 101, a body suit 102, and a control system 103. The participant 202 wears the body suit 102 while being placed within the gyroscope 101. The gyroscope 101 controls the position of the participant 202 relative to the force of gravity. The body suit 102: 1) applies pressure against the participant 202; and, 2) secures the participant 202 within the gyroscope 101. The control system 103 operates the invention 100.

The invention 100 is adapted for use with a computer generated reality system 201 and a participant 202. The computer generated reality system 201 is an externally provided computer system that generates a computer generated reality scenario within which the participant 201 is immersed. The computer generated reality system 201 provides a plurality of control signals 203 that instruct the control system 103 as to the tactile requirement of the computer generated reality scenario. The participant 202 is a person who is immersed within the computer generated reality scenario. The plurality of control signals 203 refers to communication between the computer generated reality system 201 and the control system 103.

The gyroscope 101 is a physical structure that: 1) the participant 202 is placed within; and, 2) changes the orientation of the participant 202 relative to the force of gravity. The gyroscope 101 comprises a ring 114 which the gyroscope 101 rotates around two perpendicular axes of rotation. The control of these rotations by the control system 103 allows the invention 100 to adjust the orientation of the participant 202 relative to the force of gravity.

The gyroscope 101 comprises a pedestal 111, a slewing bearing 112, a ring mount 113, a ring 114, a slewing bearing motor 115, and a ring motor 116. The pedestal 111 is a supporting structure that is the inferior structure of the gyroscope 101. The pedestal 111 is placed upon the supporting surface. The slewing bearing 112 is a slewing bearing 112 that is mounted on the superior surface of the pedestal 111. The ring mount 113 attaches to the slewing bearing 112 such that the ring mount 113 will rotate around a vertical axis of rotation 171. The ring mount 113 is rotated around the vertical axis of rotation 171 by the slewing bearing motor 115.

The ring mount 113 is a U shaped structure. The cross arm of the U structure is attached to the slewing bearing 112. The ring 114 attaches to the ring mount 113 between the two cantilever arms of the U shape. The ring 114 is a circular device within which the participant 202 is placed. The ring 114 attaches to the ring mount 113 such that the ring 114 will rotate around a horizontal axis of rotation 172 that is perpendicular to the vertical axis of rotation 171. The ring 114 is rotated around the horizontal axis of rotation 172 by the ring motor 116.

The slewing bearing motor 115 is an electrical motor that is controlled by the control system 103. The slewing bearing motor 115 rotates the ring mount 113 around the slewing bearing 112. The slewing bearing motor 115 is further assumed to incorporate the required motor control circuitry. The ring motor 116 is an electrical motor that is controlled by the control system 103. The ring motor 116 rotates the ring 114 within the ring mount 113. The ring motor 116 is further assumed to incorporate the required motor control circuitry.

The body suit 102 is a structure that is worn like a garment. The body suit 102: 1) secures the participant 202 within the ring 114 of the gyroscope 101; and, 2) further comprises a plurality of tactile stimulators 133 that are used to provide tactile sensations to the participant 202. The plurality of tactile stimulators 133 are controlled by the control system 103.

The body suit 102 comprises a plurality of harnesses 121 and a plurality of foot assemblies 122. Each of the plurality of harnesses 121 is a garment that: 1) clothes the participant 202; 2) secures the participant 202 within the ring 114; and, 3) positions a plurality of tactile stimulators 133 against the body of the participant 202. Each of the plurality of foot assemblies 122 is a pedal 135 assembly into which a foot of the participant 202 is placed.

Each of the plurality of harnesses 121 comprises a tight fitting garment 131, a one or more mounting straps 132, and a plurality of tactile stimulators 133. The tight fitting garment 131 is a garment that fits tightly to the participant 202. In the first potential embodiment of the disclosure, the tight fitting garment 131 is formed from an elastic textile. The one or more mounting straps 132 forms a safety harness, much like a climbing harness, that is used to secure the participant 202 to the ring 114. Methods to form harnesses from straps are well known and documented in the textile arts. The one or more mounting straps 132 are attached to the exterior surface of the tight fitting garment 131.

Each of the plurality of tactile stimulators 133 is an independently controlled device that provides a tactile sensation to the participant 202. The plurality of tactile stimulators 133 are mounted on the interior surface of the tight fitting garment 131. The elasticity of the tight fitting garment 131 provides the counterforce against which each of the plurality of tactile stimulators 133 presses when applying a tactile pressure against the participant 202.

Each of the plurality of foot assemblies 122 comprises a stirrup 134 and a pedal 135. The stirrup 134 forms an "upper of a shoe" like device that secures a foot of the participant 202 to the pedal 135. The pedal 135 is a plate upon which the foot of the participant 202 is placed and against which the foot presses.

The plurality of harnesses 121 comprises a torso harness 125 and a waist harness 126. The torso harness 125 is a harness selected from the plurality of harnesses 121 that is worn around the chest of the participant 202. The waist harness 126 is a harness selected from the plurality of harnesses 121 that is worn around the pelvic region of the participant 202.

The plurality of foot assemblies 122 comprises a left foot assembly 127 and a right foot assembly 128. The left foot assembly 127 is the foot assembly selected from the plurality of foot assemblies 122 which receives the left foot of the participant 202. The right foot assembly 128 is the foot assembly selected from the plurality of foot assemblies 122 which receives the right foot of the participant 202.

The control system 103 manages and regulates the operation of the gyroscope 101 and the body suit 102. The control system comprises a logic module 141, a slewing motor control signal 142, a ring motor control signal 143, a plurality of tactile controls 144, and an energy source 145.

The logic module 141 is a readily and commercially available programmable electronic device that is used to manage, regulate, and operate the control system 103. The slewing motor control signal 142 is an electrical signal generated by the logic module 141 that is used to control the slewing bearing motor 115. The ring motor control signal 143 is an electrical signal generated by the logic module 141 that is used to control the ring motor 116.

Each of the plurality of tactile controls 144 is a device that manages the operation of a tactile stimulator selected from the plurality of tactile stimulators 133. Each of the plurality of tactile controls 144 corresponds to a tactile stimulator selected from the plurality of tactile stimulators 133 in a one to one fashion.

The energy source 145 refers to the source of energy that is used to operate each of the plurality of tactile stimulators 133.

In the first potential embodiment of the disclosure, the energy source 145 is a compressed air source 151. The compressed air source 151 refers to a reservoir of compressed air that is used as the energy source 145. Each of the plurality of tactile stimulators 133 is a telescopic pin 152.

The telescopic pin 152 refers to two cylindrical tubes that are attached to each other in a telescopic fashion. The telescopic pin 152 is attached to the compressed air source 151 such that when compressed air is introduced into the telescopic pin 152, the length of the telescopic pin 152 is adjusted. The extension of the telescopic pin 152 applies a tactile pressure against the participant 202 that can be felt by the participant 202.

Each of the plurality of tactile controls 144 is a solenoid valve 153. The compressed air source 151 is controlled using a solenoid valve 153. The solenoid valve 153 is a valve that controls the flow of compressed air from the compressed air source 151 into the telescopic pin 152. The solenoid valve 153 is controlled by the logic module 141.

In a second potential embodiment of the disclosure, the energy source 145 is a compressed air source 151.

Each of the plurality of tactile stimulators 133 is a bladder 155. The bladder 155 is a gas containment device that receives compressed air from the compressed air source 151. The inflation of the bladder 155 applies a tactile pressure against the participant 202 that can be felt by the participant 202.

Each of the plurality of tactile controls 144 is a solenoid valve 153. The compressed air source 151 is controlled using a solenoid valve 153 to feed compressed air into the bladder 155. The solenoid valve 153 is a valve that controls the flow of compressed air from the compressed air source 151 into the bladder 155. The solenoid valve 153 is controlled by the logic module 141.

In a third potential embodiment of the disclosure, the energy source 145 is an externally provided electrical energy source 161. A solenoid 162 combines the functions of each of the plurality of tactile controls 144 and each of the plurality of tactile stimulators 133. The solenoid 162 is an electrical device that, upon the application of an electrical signal, extends a shaft directly into the body of the participant 202. Each solenoid 162 is controlled independently via the logic module 141.

The following definitions were used in this disclosure:

Bladder: As used in this disclosure, a bladder is gas impermeable structure. The internal volume of the structure can be varied by: varying the pressure and or quantity of a gas contained within the bladder; or 2) varying the quantity of a liquid contained within the bladder. Bladders are commonly used for storage of a gas or liquid and as a cushion.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Compressed Air: In this disclosure, compressed air means air that has been compressed to a pressure greater than atmospheric pressure.

Control System: As used in this disclosure, a control system is a first device or system that manages and regulates the behavior or operation of a second device or system.

Correspond: As used in this disclosure, the term correspond is used as a comparison between two or more objects wherein one or more properties shared by the two or more objects match, agree, or align within acceptable manufacturing tolerances.

Elastic: As used in this disclosure, an elastic is a material or object that deforms when a force is applied to it and that is able to return to its original shape after the force is removed. A material that exhibits these qualities is also referred to as an elastomeric material.

Elastic Textile: As used in this disclosure, an elastic textile is a textile that contains elastic yarns as some of the yarns that make up the textile. An elastic textile is constructed such that the elastic textile will stretch when a force is applied and will return to its original shape when after the force is removed.

Electric Motor: In this disclosure, an electric motor is a machine that converts electric energy into rotational mechanical energy.

Exterior: As used in this disclosure, the exterior is use as a relational term that implies that an object is not contained within the boundary of a structure or a space.

Harness: As used in this disclosure, a harness is an apparatus comprising a plurality of straps and one or more fasteners that is used to anchor a first person or first object to a second object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity.

Interior: As used in this disclosure, the interior is use as a relational term that implies that an object is contained within the boundary of a structure or a space.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs.

Loop: As used in this disclosure, a loop is the length of a first linear structure including, but not limited to, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Mesh: As used in this disclosure, the term mesh refers to an openwork fabric made from threads, yarns, cords, wires, or lines that are woven, knotted, or otherwise twisted or intertwined at regular intervals. Synonyms for mesh include net.

Motor: As used in this disclosure, a motor refers to the method of transferring energy from an external power source into mechanical energy.

One to One: When used in this disclosure, a one to one relationship means that a first element selected from first set is in some manner connected to only one element of a second set. A one to one correspondence means that the one to one relationship exists both from the first set the second set and from the second set to the first set. A one to one fashion means that the one to one relationship exists in only one direction.

Pedal: As used in this disclosure, a pedal is a foot-operated lever that is used by the foot to power or operate devices.

Pelvis: As used in this disclosure, the pelvis refers to a bone structure near the base of the spine to which buttocks and the legs are joined. As used in this disclosure, the term pelvis is a more generally expanded to describe the above described region of the body. As used in this disclosure, the adjectival form of pelvis is pelvic.

Ring: As used in this disclosure, a ring is term that is used to describe a flat or plate like structure through which an aperture is formed.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Slewing Bearing: As used in this disclosure, a slewing bearing is a device that is used to rotate an object on a horizontal surface. Slewing bearings are often called turntable bearings or a lazy Susan bearing.

Solenoid: As used in this disclosure, a solenoid is a cylindrical coil of electrical wire that generates a magnetic field that can be used to mechanically move a shaft made of a magnetic core.

Solenoid Valve: As used in this disclosure, a solenoid valve is an electromechanically controlled valve that is used to control fluid or gas flow. A two port solenoid valve opens or closes to fluid flow through the valve portion of the solenoid valve. A three port solenoid valve switched fluid or gas flow between a first port and a second port to either feed or be fed from a third port.

Strip: As used in this disclosure, the term describes a long and narrow object of uniform thickness that appears thin relative to the length of the object. Strips are often rectangular in shape.

Stirrup: As used in this disclosure, a stirrup is a is a textile structure that is formed such that a person can be secured to an object, or the object to the person, by securing the textile structure to the object and then inserting a first foot of the person into the textile structure.

Superior: As used in this disclosure, the term superior refers to a directional reference that is parallel to and in the opposite direction of the force of gravity.

Supporting Surface: As used in this disclosure, a supporting surface is a horizontal surface upon which an object is placed. Within this disclosure, it is assumed that the object is placed on the supporting surface in an orientation that is appropriate for the normal or anticipated use of the object.

Telescopic: As used in this disclosure, telescopic is an adjective that describes an object made of sections that fit or slide into each other such that the object can be made longer or shorter by adjusting the relative positions of the sections.

Textile: As used in this disclosure, a textile is a material that is woven, knitted, braided or felted. Synonyms in common usage for this definition include fabric and cloth.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 10 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An apparatus for physical training comprising:
   wherein the apparatus for physical training comprises a gyroscope, a body suit, and a control system;
   wherein the participant wears the body suit while being placed within the gyroscope;
   wherein the body suit secures the participant within the gyroscope;
   wherein the control system operates the apparatus for physical training; wherein the apparatus for physical training is configured for use with a computer generated reality system;
   wherein the computer generated reality system creates a computer generated reality;
   wherein the computer generated reality system is further defined with control signals;
   wherein the apparatus for physical training is configured for use with a participant;
   wherein the apparatus for physical training is a peripheral device that interfaces with the computer generated reality system to create a physical representation of the created computer generated reality;
   wherein the apparatus for physical training responds to control signals that are generated by the computer generated reality system; wherein the apparatus for physical training supplements the visual and audio stimuli generated provided by the computer generated reality system with tactile stimuli appropriate to the computer generated reality that is being rendered wherein the gyroscope controls the position of the participant relative to the force of gravity;

wherein the body suit applies pressure against the participant; wherein the gyroscope is a physical structure that the participant is placed within;

wherein the gyroscope changes the orientation of the participant relative to the force of gravity;

wherein the gyroscope comprises a pedestal, a slewing bearing, a ring mount, a ring, a slewing bearing motor, and a ring motor;

wherein the slewing bearing attaches the pedestal to the ring mount;

wherein the ring attaches to the ring mount;

wherein the slewing bearing motor is a motor that changes the orientation of the ring relative to the force of gravity;

wherein the ring motor is a motor that changes the orientation of the ring relative to the force of gravity.

2. The apparatus for physical training according to claim 1 wherein the pedestal is a supporting structure;

wherein the pedestal is placed upon the supporting surface;

wherein the slewing bearing is a slewing bearing that is mounted on the superior surface of the pedestal.

3. The apparatus for physical training according to claim 2 wherein the ring mount attaches to the slewing bearing such that the ring mount will rotate around a vertical axis of rotation;

wherein the ring mount is rotated around the vertical axis of rotation by the slewing bearing motor.

4. The apparatus for physical training according to claim 3 wherein the ring is a circular device within which the participant is placed;

wherein the ring mount is a U shaped structure;

wherein the U shaped structure is further defined with a cross arm and two cantilever arms;

wherein the cross arm of the U shaped structure attaches to the slewing bearing;

wherein the ring attaches to the ring mount between the two cantilever arms of the U shaped structure.

5. The apparatus for physical training according to claim 4 wherein the ring attaches to the ring mount such that the ring will rotate around a horizontal axis of rotation that is perpendicular to the vertical axis of rotation;

wherein the ring is rotated around the horizontal axis of rotation by the ring motor.

6. The apparatus for physical training according to claim 5 wherein the slewing bearing motor is an electrical motor that is controlled by the control system;

wherein the ring motor is an electrical motor that is controlled by the control system.

7. The apparatus for physical training according to claim 6 wherein the body suit is a structure that is worn like a garment;

wherein the body suit comprises a plurality of harnesses and a plurality of foot assemblies;

wherein each of the plurality of harnesses is a garment that clothes the participant;

wherein each of the plurality of harnesses secures the participant within the ring;

wherein each of the plurality of harnesses positions a plurality of tactile stimulators against the body of the participant;

wherein each of the plurality of foot assemblies is a pedal assembly into which a foot of the participant is placed.

8. The apparatus for physical training according to claim 7 wherein each of the plurality of harnesses comprises a tight fitting garment, a one or more mounting straps, and the plurality of tactile stimulators;

wherein the tight fitting garment is a garment that fits tightly to the participant;

wherein the tight fitting garment is formed from an elastic textile;

wherein the one or more mounting straps forms a safety harness that is used to secure the participant to the ring;

wherein each of the plurality of tactile stimulators is an independently controlled device that provides a tactile sensation to the participant;

wherein the one or more mounting straps are attached to the exterior surface of the tight fitting garment;

wherein the plurality of tactile stimulators are mounted on the interior surface of the tight fitting garment;

wherein the elasticity of the tight fitting garment provides the counterforce against which each of the plurality of tactile stimulators presses when applying a tactile pressure against the participant.

9. The apparatus for physical training according to claim 8 wherein each of the plurality of foot assemblies comprises a stirrup and a pedal;

wherein the stirrup secures a foot of the participant to the pedal;

wherein the pedal is a plate upon which the foot of the participant is placed.

10. The apparatus for physical training according to claim 9 wherein the control system manages and regulates the operation of the gyroscope and the body suit;

wherein the control system comprises a logic module, a slewing motor control signal, a ring motor control signal, a plurality of tactile controls, and an energy source;

wherein the logic module, the slewing motor control signal, the ring motor control signal, and the plurality of tactile controls are electrically interconnected;

wherein the energy source is a source of energy that is used to operate each of the plurality of tactile stimulators.

11. The apparatus for physical training according to claim 10 wherein the logic module is a programmable electronic device;

wherein the slewing motor control signal is an electrical signal generated by the logic module that is used to control the slewing bearing motor;

wherein the ring motor control signal is an electrical signal generated by the logic module that is used to control the ring motor.

12. The apparatus for physical training according to claim 11 wherein each of the plurality of tactile controls is a device that manages the operation of a tactile stimulator selected from the plurality of tactile stimulators;

wherein each of the plurality of tactile controls corresponds to a tactile stimulator selected from the plurality of tactile stimulators in a one to one fashion.

13. The apparatus for physical training according to claim 12 wherein the plurality of harnesses comprises a torso harness and a waist harness;

wherein the torso harness is a harness selected from the plurality of harnesses that is worn around the chest of the participant;

wherein the waist harness is a harness selected from the plurality of harnesses that is worn around the pelvic region of the participant.

14. The apparatus for physical training according to claim 13 wherein the plurality of foot assemblies comprises a left foot assembly and a right foot assembly;

wherein the left foot assembly is the foot assembly selected from the plurality of foot assemblies which receives the left foot of the participant;

wherein the right foot assembly is the foot assembly selected from the plurality of foot assemblies which receives the right foot of the participant.

15. The apparatus for physical training according to claim 14 wherein the energy source is a compressed air source;

wherein each of the plurality of tactile stimulators is a telescopic pin;

wherein the telescopic pin is attached to the compressed air source such that when compressed air is introduced into the telescopic pin, the length of the telescopic pin is adjusted;

wherein each of the plurality of tactile controls is a solenoid valve;

wherein the solenoid valve is a valve that controls the flow of compressed air from the compressed air source into the telescopic pin;

wherein the solenoid valve is controlled by the logic module.

16. The apparatus for physical training according to claim 15 wherein the telescopic pin refers to two cylindrical tubes that are attached to each other in a telescopic fashion;

wherein the extension of the telescopic pin applies a tactile pressure against the participant.

17. The apparatus for physical training according to claim 13 wherein the energy source is a compressed air source;

wherein each of the plurality of tactile stimulators is a bladder;

wherein the bladder is attached to the compressed air source such that when compressed air is introduced into the bladder then the bladder inflates;

wherein each of the plurality of tactile controls is a solenoid valve;

wherein the solenoid valve is a valve that controls the flow of compressed air from the compressed air source into the telescopic pin;

wherein the solenoid valve is controlled by the logic module;

wherein the inflation of the bladder applies a tactile pressure against the participant.

18. The apparatus for physical training according to claim 13 wherein the energy source is an externally provided electrical energy source;

wherein a solenoid combines the functions of each of the plurality of tactile controls and each of the plurality of tactile stimulators;

wherein the solenoid is an electrical device that extends a shaft directly into the body of the participant;

wherein the extension of the shaft applies a tactile pressure against the participant;

wherein each solenoid is controlled independently by the logic module.

* * * * *